United States Patent [19]

Rody et al.

[11] Patent Number: 5,102,927

[45] Date of Patent: Apr. 7, 1992

[54] POLYOLEFINES WHICH HAVE BEEN STABILIZED WITH BIS-(POLYALKYLPIPERIDINYLAMINO 1,3,5-TRIAZINES OR TRIS-(POLYALKYLPIPERIDINYLAMINO)-1,3-5-TRIAZINES

[75] Inventors: Jean Rody, Riehen; Francois Gugumus, Allschwil, both of Switzerland

[73] Assignee: Ciba-Geigy Corporation, Ardsley, N.Y.

[21] Appl. No.: 686,273

[22] Filed: Apr. 15, 1991

Related U.S. Application Data

[63] Continuation of Ser. No. 584,415, Sep. 17, 1990, abandoned, which is a continuation of Ser. No. 135,513, Dec. 18, 1987, abandoned, which is a continuation of Ser. No. 820,832, Jan. 21, 1986, abandoned, which is a continuation of Ser. No. 633,729, Jul. 23, 1984, abandoned, which is a continuation of Ser. No. 534,956, Sep. 22, 1983, abandoned.

[30] Foreign Application Priority Data

Sep. 30, 1982 [CH] Switzerland .......................... 5756/82

[51] Int. Cl.$^5$ .............................................. C08K 5/34
[52] U.S. Cl. ................................................... 524/100
[58] Field of Search ................. 524/99, 100, 102, 198, 524/200, 212, 219

[56] References Cited

U.S. PATENT DOCUMENTS

| | | | |
|---|---|---|---|
| 4,028,334 | 7/1977 | Chalmers et al. | 524/100 |
| 4,234,726 | 11/1980 | Rody et al. | 524/100 |
| 4,294,963 | 10/1981 | Rody | 544/198 |
| 4,321,374 | 3/1982 | Morimura et al. | 544/198 |
| 4,356,287 | 10/1982 | Loffelman et al. | 524/100 |
| 4,376,836 | 3/1983 | Wiezer et al. | 524/100 |
| 4,426,471 | 1/1984 | Berner | 524/100 |
| 4,476,302 | 10/1984 | Wiezer et al. | 524/101 |
| 4,477,615 | 10/1984 | Raspanti et al. | 544/198 |
| 4,530,950 | 7/1985 | Raspanti et al. | 524/100 |

FOREIGN PATENT DOCUMENTS

2319816 7/1982 Fed. Rep. of Germany .

*Primary Examiner*—Kriellion S. Morgan
*Attorney, Agent, or Firm*—Harry Falber

[57] ABSTRACT

A particularly good stabilization against oxidative and light-induced degradation of polyolefines is obtained by adding compounds of the formula I

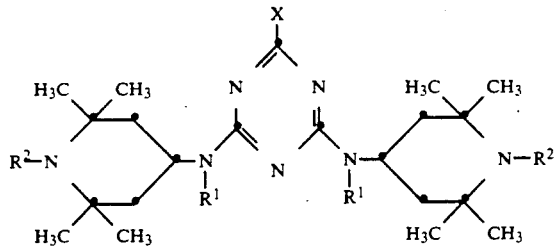

in which $R^1$ is not hydrogen.

7 Claims, No Drawings

POLYOLEFINES WHICH HAVE BEEN STABILIZED WITH BIS-(POLYALKYLPIPERIDINYLAMINO 1,3,5-TRIAZINES OR TRIS-(POLYALKYLPIPERIDINYLAMINO)-1,3-5-TRIAZINES

This application is a continuation of application Ser. No. 584,415, filed Sept. 17, 1990, now abandoned, which is a continuation of Ser. No. 135,513, filed Dec. 18, 1987, now abandoned, which is a continuation of Ser. No. 820,832, filed Jan. 21, 1986, now abandoned, which is a continuation of Ser. No. 633,729, filed Jul. 23, 1984, now abandoned, which is a continuation of Ser. No. 534,956, filed Sept. 22, 1983, now abandoned.

The present invention relates to the stabilisation of polyolefines against oxidative and light-induced degradation, by adding a quantity of a bis-(polyalkyl-piperidinyltert.-amino)-1,3,5-triazine or tris-(polyalkyl-piperidinyltert.-amino)-1,3,5-triazine which is adequate to prevent the degradation.

The stabilisation of synthetic polymers by adding mono-, bis- and tris-(polyalkylpiperidinylamino)-1,3,5-triazines is already described in German Offenlegungsschrift 2,319,816, but in this case "amino" is exclusively secondary amino.

It has now been found that analogous compounds in which secondary amino has been replaced by tertiary amino ensure a surprisingly improved stabilisation, particularly in polyolefines.

Accordingly, the present invention relates to polyolefines containing, as the stabiliser, a compound of the formula I

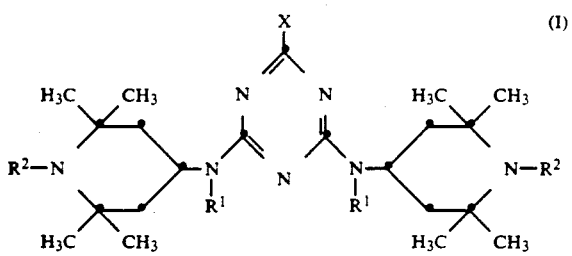

in which X is a group

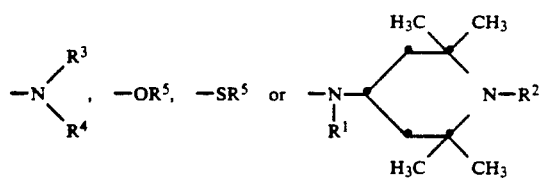

$R^1$ is $C_1-C_{18}$-alkyl, $C_5-C_{12}$-cycloalkyl, $C_7-C_{11}$-aralkyl, $C_3-C_{12}$-alkyl which is interrupted by —O— or —N($R^6$)—, $C_2-C_6$-carboxyalkyl or $C_3-C_{12}$-alkoxycarbonylalkyl or is a group —A—O—Q in which A is methylene, ethylene or trimethylene and Q is phenyl which is unsubstituted or monosubstituted, disubstituted or trisubstituted by $C_1-C_4$-alkyl, or is a group of the formula

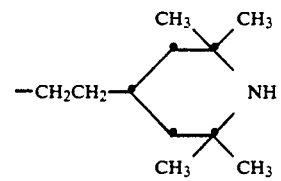

$R^2$ is hydrogen, $C_1-C_4$-alkyl, benzyl, allyl, acetyl, acryloyl, (amine)oxide or a group

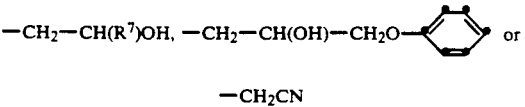

—CH$_2$CN $R^3$ and $R^4$ independently of one another are $C_1-C_{18}$-alkyl, $C_5-C_{12}$-cycloalkyl, $C_7-C_{11}$-aralkyl or $C_3-C_{12}$-alkyl which is interrupted by —O— or —N($R^6$)—, $C_2-C_4$-hydroxyalkyl, $C_3-C_{15}$-acyloxyalkyl, $C_2-C_6$-carboxyalkyl or $C_3-C_{12}$-alkoxycarbonylalkyl, and $R^4$ can additionally also be hydrogen, or $R^3$ and $R^4$, together with the N atom to which they are attached, form a heterocyclic ring, $R^5$ is $C_1-C_{18}$-alkyl, $C_3-C_{12}$-alkenyl, $C_5-C_{12}$-cycloalkyl, $C_7-C_{11}$-aralkyl or $C_3-C_{12}$-alkyl which is interrupted by —O— or —N($R^6$)—, $R^6$ is $C_1-C_4$-alkyl and $R^7$ is methyl, ethyl or phenyl.

If any substituents are alkyl, they are linear or branched alkyl groups. If they are $C_1-C_4$-alkyl, they are, for example, methyl, ethyl, n-propyl, isopropyl, n-butyl, sec.-butyl or tert.-butyl. If they are $C_1-C_{18}$-alkyl, additional suitable examples are n-pentyl, 2,2-dimethylpropyl, n-hexyl, 2,3-dimethylbutyl, n-octyl, 1,1,3,3-tetramethylbutyl, n-nonyl, decyl, dodecyl, tetradecyl, hexadecyl, heptadecyl or octadecyl. If any substituents are $C_5-C_{12}$-cycloalkyl, they are, for example, cyclopentyl, cyclohexyl, cyclooctyl, cyclodecyl or cyclododecyl. Cyclohexyl is preferred.

If any substituents are $C_7-C_{11}$-aralkyl, they are, for example, phenalkyl or naphthalkyl, the alkyl moiety in the case of phenalkyl consisting in each case of branched or unbranched $C_1-C_4$-alkyl. Preferred phenalkyl radicals are α,α-dimethylbenzyl, 1-phenylethyl, 2-phenylethyl and benzyl. Examples of naphthylalkyl radicals are 1-naphthylmethyl and 2-naphthylmethyl. Benzyl is preferred.

When they are $C_2-C_4$-hydroxyalkyl, $R^3$ and $R^4$ can, for example, be 2-hydroxyethyl, 3-hydroxypropyl or 4-hydroxybutyl. 2-Hydroxyethyl is preferred.

If $R^5$ is $C_3-C_{12}$-alkenyl, it is, for example, allyl, methallyl, 2-butenyl, 2-pentenyl, 2-hexenyl, 2-octenyl or 2-dodecenyl. Allyl is preferred.

As $C_3-C_{15}$-acyloxyalkyl, $R^3$ is, for example, acetoxymethyl, acetoxyethyl, acetoxypropyl, propionyloxymethyl, propionyloxyethyl, butyroyloxyethyl, hexanoyloxyethyl, lauroyloxyethyl or lauroyloxypropyl.

Examples of $C_3-C_{12}$-alkyl which is interrupted by —O— or —N($R^6$)— are 2-methoxyethyl, 2-ethoxyethyl, 2-n-propoxyethyl, 2-isopropoxyethyl, 3-methoxypropyl, 3-ethoxypropyl, 4-methoxybutyl, 6-ethoxyhexyl, 10-ethoxydecyl, 2-dimethylaminoethyl, 2-diethylaminoethyl, 3-dimethylaminopropyl, 3-diethylaminopropyl, 3-di-isopropylaminopropyl and 3-di-n-butylaminopropyl.

The following are examples of the group —A—O—Q: 2-(4-methylphenoxy)-ethyl, 3-(4-methylphenoxy)-propyl, 3-(4-tert.-butylphenoxy)-propyl, 3-(2,4,6-trimethylphenoxy)-propyl, 3-(2,4-di-tert.-butylphenoxy)-propyl and (2,4,6-trimethylphenoxy)-methyl.

If $R_1$, $R_3$ or $R_4$ are $C_2-C_6$-carboxyalkyl, this is, for example, carboxymethyl, carboxyethyl, carboxypropyl, carboxybutyl or carboxypentyl.

If $R_1$, $R_3$ or $R_4$ are $C_3-C_{12}$-alkoxycarbonylalkyl, this is, for example, methoxycarbonylmethyl, ethoxycarbonylmethyl, propoxycarbonylmethyl, butoxycarbonylmethyl, octyloxycarbonylmethyl, decyloxycarbonylmethyl, methoxycarbonylethyl, ethoxycarbonylethyl, propoxycarbonylethyl, butoxycarbonylethyl, methoxycarbonylpropyl, ethoxycarbonylpropyl, methoxycarbonylbutyl or ethoxycarbonylbutyl.

If $R_3$ and $R_4$, together with the N atom to which they are attached, are a heterocyclic ring, this is, for example, a pyrrolidine, oxazolidine, piperidine, morpholine, piperazine or hexamethyleneimine ring which is unsubstituted or substituted by up to 5 methyl or ethyl groups. These ring systems are preferably unsubstituted.

Polyolefines which are of particular interest are those containing a compound of the formula I in which X is a group

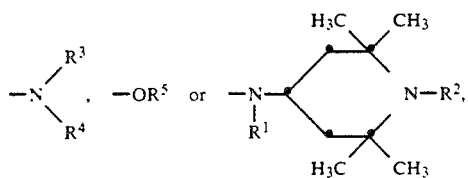

$R^1$ is $C_1-C_{18}$-alkyl, cyclohexyl or benzyl, $R^2$ is hydrogen, $C_1-C_4$-alkyl, benzyl, allyl or $C_2-C_3$-hydroxyalkyl, $R^3$ and $R^4$ independently of one another are $C_1-C_{18}$-alkyl, cyclohexyl, benzyl or $C_2-C_3$-hydroxyalkyl and $R^4$ is additionally also hydrogen and $R^5$ is $C_1-C_{12}$-alkyl, $C_3-C_4$-alkenyl, cyclohexyl or benzyl.

Polyolefines which are of very particular interest are those containing, as the stabiliser, a compound of the formula I in which X is a group

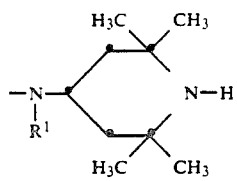

and $R^1$ is $C_1-C_8$-alkyl, and also those polyolefines which are stabilised by adding a compound of the formula I in which X is a group

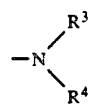

or $-OR^5$, $R^1$ is $C_1-C_8$-alkyl, $R^2$ is hydrogen, $R^3$ and $R^4$ are identical and are $C_1-C_8$-alkyl and $R^5$ is $C_3-C_8$-alkyl.

Preferred compounds of the formula I to be employed in accordance with the invention are those in which $R^1$ is $C_4-C_{18}$-alkyl, in particular n-butyl.

The preparation of the compounds to be employed in accordance with the invention as stabilisers is effected analogously to processes known per se, such as are described, for example, in German Offenlegungsschrift 2,319,816. The starting materials are known.

The following are examples of polyolefines which can be stabilised in accordance with the invention with compounds of the formula I:

1. Polymers of monoolefines and diolefines, for example polyethylene (which can, if appropriate, be cross-linked), polypropylene, polyisobutylene, polybut-1-ene, polymethylpent-1-ene, polyisoprene or polybutadiene and also polymers of cycloolefines, for example cyclopentene or norbornene.

2. Mixtures of the polymers mentioned under 1), for example mixtures of polypropylene with polyethylene or with polyisobutylene.

3. Copolymers of monoolefines and diolefines with one another or with other vinyl monomers, for example ethylene/propylene copolymers, propylene/but-1-ene copolymers, propylene/isobutylene copolymers, ethylene/but-1-ene copolymers, propylene/butadiene copolymers, isobutylene/isoprene copolymers, ethylene/alkyl acrylate copolymers, ethylene/alkyl methacrylate copolymers, ethylene/vinyl acetate copolymers or ethylene/acrylic acid copolymers and salts thereof (ionomers), and also terpolymers of ethylene with propylene and a diene, such as hexadiene, dicyclopentadiene or ethylidenenorbornene.

The stabilisers are added to the plastics in a concentration of 0.01 to 5% by weight, based on the material to be stabilised. It is preferable to incorporate into the material to be stabilised 0.03 to 1.5, particularly preferably 0.2 to 0.6, % by weight of the compounds, based on the said material.

The incorporation can be effected after polymerisation, for example by mixing the compounds, and, if desired, further additives, into the melt by the methods customary in the state of the art, before or during shaping, or by applying the compounds, in a dissolved or dispersed state, to the polymer, subsequently removing the solvent if desired, by evaporation.

The invention therefore also relates to the plastics which have been stabilised by adding 0.01 to 5% by weight of a compound of the formula I, and which can, if desired, also contain other known and customary additives. The plastics stabilised in this manner can be used in very diverse forms, for example as films, fibres, tapes or profiles.

The following may be mentioned as examples of further additives which can be employed in conjuction with the stabilisers to be used in accordance with the invention:

1. Antioxidants 1.1. Alkylated monophenols 2,6-Di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-i-butylphenol, 2,6-di-cyclopentyl-4-methylphenol, 2-(α-methylcyclohexyl)-4,6-dimethylphenol, 2,6-di-octadecyl-4-methylphenol, 2,4,6-tri-cyclohexylphenol and 2,6-di-tert.-butyl-4-methoxymethylphenol.

1.2. Alkylated hydroquinones 2,6-Di-tert.-butyl-4-methoxyphenol, 2,5-di-tert.-butylhydroquinone, 2,5-di-tert.-amylhydroquinone and 2,6-diphenyl-4-octadecyloxyphenol.

1.3. Hydroxylated thiodiphenyl ethers 2,2'-Thio-bis-(6-tert.-butyl-4-methylphenol), 2,2'-thio-bis-(4-octylphenol), 4,4'-thio-bis-(6-tert.-butyl-3-methylphenol) and 4,4'-thio-bis-(6-tert.-butyl-2-methylphenol).

1.4. Alkylidene-bisphenols 2,2'-Methylene-bis-(6-tert.-butyl-4-methylphenol), 2,2'-methylene-bis-(6-tert.-butyl-4-ethylphenol), 2,2'-methylene-bis-[4-methyl-6-(α-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-(4,6-di-tert.-butylphenol), 2,2'-ethylidene-bis-(4,6-di-tert.-butylphenol), 2,2'-ethylidene-bis-(6-tert.-butyl-4-isobutylphenol), 4,4'-methylene-bis-(2,6-di-tert.-butylphenol), 4,4'-methylene-bis-(6-tert.-butyl-2-methylphenol), 1,1-bis-(5-tert.-butyl-4-hydroxy-2-methylphenyl)-butane, 2,6-di-(3-tert.-butyl-5-methyl-2-hydroxybenzyl)-4-methylphenol, 1,1,3-tris-(5-tert.-butyl-4-hydroxy-2-methylphenyl)-butane, 1,1-bis-(5-tert.-butyl-4-hydroxy-2-methylphenyl)-3-n-dodecylmercaptobutane, ethylene glycol bis-[3,3-bis-(3'-tert.-butyl-4'-hydroxyphenyl)-butyrate], di-(3-tert.-butyl-4-hydroxy-5-methylphenyl)-dicyclopentadiene and di-[2-(3'-tert.-butyl-2'-hydroxy-5'-methylbenzyl)-6-tert.-butyl-4-methylphenyl] terephthalate.

1.5. Benzyl compounds 1,3,5-Tri-(3,5-di-tert.-butyl-4-hydroxybenzyl)-2,4,6-trimethylbenzene, di-(3,5-di-tert.-butyl-4-hydroxybenzyl)sulfide, isooctyl 3,5-di-tert.-butyl-4-hydroxybenzylmercaptoacetate, bis-(4-tert.-butyl-3-hydroxy-2,6-dimethylbenzyl)dithiol terephthalate, 1,3,5-tris-(3,5-di-tert.-butyl-4-hydroxybenzyl)isocyanurate, 1,3,5-tris-(4-tert.-butyl-3-hydroxy-2,6-dimethylbenzyl)-isocyanurate, dioctadecyl 3,5-di-tert.-butyl-4-hydroxybenzylphosphonate and the calcium salt of monoethyl 3,5-di-tert.-butyl-4-hydroxybenzyl-phosphonate.

1.6. Acylaminophenols 4-hydroxylauric acid anilide, 4-hydroxystearic acid anilide and 2,4-bis-octylmercapto-6-(3,5-di-tert.-butyl-4-hydroxyanilino)-s-triazine.

1.7. Esters of β-(3,5-di-tert.-butyl-4-hydroxyphenyl)-propionic acid with monohydric or polyhydric alcohols, for example methanol, octadecanol, 1,6-hexanediol, neopentyl glycol, thiodiethylene glycol, diethylene glycol, triethylene glycol, pentaerythritol, trishydroxyethyl isocyanurate and dihydroxyethyloxalamide.

1.8. Esters of β-(5-tert.-butyl-4-hydroxy-3-methylphenyl)propionic acid with monohydric or polyhydric alcohols, for example methanol, octadecanol, 1,6-hexanediol, neopentyl glycol, thiodiethylene glycol, diethylene glycol, triethylene glycol, pentaerythritol, trishydroxyethyl isocyanurate and di-hydroxyethyloxalamide.

1.9. Amides of β-(3,5-di-tert.-butyl-4-hydroxyphenyl)-propionic acid for example N,N'-di-(3,5-di-tert.-butyl-4-hydroxyphenylpropionyl)-hexamethylenediamine, N,N'-di-(3,5-di-tert.-butyl-4-hydroxyphenylpropionyl)-trimethylenediamine and N,N'-di-(3,5-di-tert.-butyl-4-hydroxyphenylpropionyl)hydrazine.

2. UV absorbers and light stabilisers 2.1. 2-(2'-hydroxyphenyl)-benztriazoles, for example the 5'-methyl, 3',5'-di-tert.-butyl, 5'-tert.-butyl, 5'-(1,1,3,3-tetramethylbutyl), 5-chloro-3',5'-di-tert.-butyl, 5-chloro-3'-tert.-butyl-5'-methyl, 3'-sec.-butyl-5'-tert.-butyl, 4'-octoxy and 3',5'-di-tert.-amyl derivatives.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of optionally substituted benzoic acids, for example 4-tert.-butylphenyl salicylate, phenyl salicylate, octylphenyl salicylate, dibenzoylresorcinol, bis-(4-tert.-butylbenzoyl)-resorcinol, benzoylresorcinol and 2,4-di-tert.-butylphenyl 3,5-di-tert.-butyl-4-hydroxybenzoate.

2.4. Acrylates, for example ethyl or isooctyl α-cyano-β,β-diphenyl-acrylate, methyl α-carbomethoxycinnamate, methyl or butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)-phenol], such as the 1:1 or 1:2 complex, if desired containing additional ligands such as n-butylamine, triethanolamine or N-cyclohexyldiethanolamine, nickel dibutyldithiocarbamate, nickel salts of monoalkyl 4-hydroxy-3,5-di-tert.-butylbenzylphosphonates, such as the methyl or ethyl ester, nickel complexes of ketoximes, such as 2-hydroxy-4-methylphenyl undecyl ketone oxime, and nickel complexes of 1-phenyl-4-lauroyl-5-hydroxypyrazole, if desired containing additional ligands.

2.6. Sterically hindered amines, for example bis-(2,2,6,6-tetramethylpiperidyl) sebacate, bis-(1,2,2,6,6-pentamethylpiperidyl) sebacate, bis-(1,2,2,6,6-pentamethylpiperidyl) n-butyl-3,5-di-tert.-butyl-4-hydroxybenzylmalonate, the condensation product formed from 1-hydroxyethyl-2,2,6,6-tetramethyl-4-hydroxypiperidine and succinic acid, the condensation product formed from N,N'-(2,2,6,6-tetramethylpiperidyl)hexamethylenediamine and 4-tert.-octylamino-2,6-dichloro-1,3,5-s-triazine, and tris-(2,2,6,6-tetramethylpiperidyl)nitrilotriacetate.

2.7. Oxalic acid diamides, for example 4,4'-di-octyloxyoxanilide, 2,2'-dioctyloxy-5,5'-di-tert.-butyloxanilide, 2,2'-di-dodecyloxy-5,5'-di-tert.-butyloxanilide, 2-ethoxy-2'-ethyloxanilide, N,N'-bis-(3-dimethylaminopropyl)-oxamide, 2-ethoxy-5-tert.-butyl-2'-ethyloxanilide and a mixture of the latter with 2-ethoxy-2'-ethyl-5,4'-di-tert.-butyloxanilide and mixtures of ortho-methoxy and para-methoxy-disubstituted oxanilides as well as of o-ethoxy- and p-ethoxy-disubstituted oxanilides.

3. Metal deactivators, for example N,N'-diphenyloxamide, N-salicylal-N'-salicyloylhydrazine, N,N'-bis-salicyloylhydrazine, N,N'-bis-(3,5-di-tert.-butyl-4-hydroxyphenylpropionyl)-hydrazine, 3-salicyloylamino-1,2,4-triazole and bis-benzylideneoxalic acid dihydrazide.

4. Phosphites and phosphonites, for example triphenyl phosphite, diphenyl alkyl phosphites, phenyl dialkyl phosphites, tri-(nonylphenyl) phosphite, trilauryl phosphite, trioctadecyl phosphite, distearyl-pentaerythritol diphosphite, tris-(2,4-di-tert.-butylphenyl) phosphite, diisodecyl-pentaerythritol diphosphite, di-(2,4-di-tert.-butylphenyl)-pentaerythritol diphosphite, tristearyl-sorbitol triphosphite and tetrakis-(2,4-di-tert.-butylphenyl) 4,4'-biphenylenediphosphonite.

5. Compounds which destroy peroxides, for example esters of β-thio-dipropionic acid, for example the lauryl, stearyl, myristyl or tridecyl esters, mercaptobenzimidazole, the zinc salt of 2-mercaptobenzimidazole, zinc dibytyldithiocarbamate, dioctadecyl disulfide and pentaerythritol tetrakis-( -dodecylmercapto)-propionate.

6. Polyamide stabilisers, for example copper salts in combination with iodides and/or phosphorous compounds, and salts of divalent manganese.

7. Basic co-stabilisers, for example malamine, polyvinylpyrrolidone, dicyandiamide, triallyl cyanurate, urea derivatives, hydrazine derivatives, amines, polyamides, polyurethanes and alkali metal salts and alkaline earth metal salts of higher fatty acids, for example Ca stearate, Zn stearate, Mg stearate, Na ricinoleate, K palmitate, antimony pyrocatecholate or tin pyrocatecholate.

8. Nucleating agents, for example 4-tert.-butylbenzoic acid, adipic acid and diphenylacetic acid.

9. Fillers and reinforcing agents, for example, calcium carbonate, silicates, glass fibres, asbestos, talc, kaolin, mica, barium sulfate, metal oxides and hydroxides, carbon black and graphite.

10. Other additives, for example plasticisers, lubricants, emulsifiers, pigments, fluorescent brighteners, flame-retarding agents, antistatic agents and blowing agents.

The preparation and use of the compounds to be employed in accordance with the invention is illustrated in greater detail in the following examples. In these examples, parts are by weight.

EXAMPLE 1

53.6 g of 2-chloro-4,6-bis-(2,2,6,6-tetramethyl-4-piperidylbutylamino)-1,3,5-triazine, together with 15.0 g of dipropylamine in 250 ml of xylene, are stirred under reflux for 16 hours. After cooling to room temperature, 100 ml of 2N sodium hydroxide solution are added, the mixture is stirred vigorously for 15 minutes and the aqueous phase is then separated off. The xylene solution is dried over sodium sulfate and evaporated in vacuo. Crystallisation of the resulting residue from acetonitrile gives 2-dipropylamino-4,6-bis-(2,2,6,6-tetramethyl-4-piperidylbutylamino)-1,3,5-triazine, melting point 95°-96° C.

EXAMPLES 2–46

A procedure analogous to that described in Example 1 is followed, affording the compounds indicated in Tables I and II below.

TABLE 1

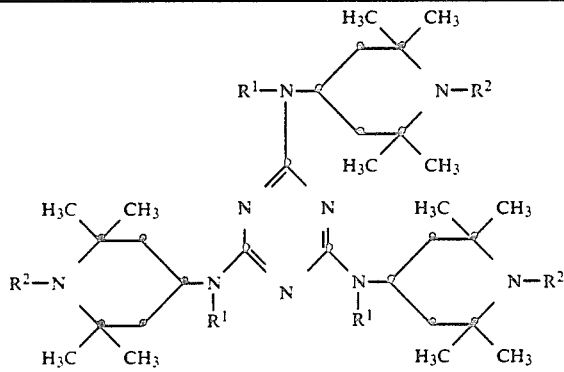

| Example no. | $R^1$ | $R^2$ | Physical Properties |
|---|---|---|---|
| 2 | —$CH_3$ | —H | m.p. 232-233° C. |
| 3 | —$C_2H_5$ | —H | m.p. 229-230° C. |
| 4 | —$C_4H_9$ | —H | m.p. 165-166° C. |
| 5 | —$C_8H_{17}$ | —H | b.p. 0.001~180° C. |
| 6 | —$C_{12}H_{25}$ | —H | b.p. 0.001~185° C. |
| 7 | —$C_{18}H_{37}$ | —H | m.p. <50° C. |
| 8 | —$CH_2$—C$_6$H$_5$ | —H | m.p. 201-202° C. |
| 9 | —$(CH_2)_3$—O—C$_6$H$_4$—$C(CH_3)_3$ | —H | m.p. 195-196° C. |
| 10 | —$C_4H_9$ | —$CH_3$ | m.p. 154° C. |
| 11 | —$C_4H_9$ | —$CH_2CH=CH_2$ | m.p. 160-162° C. |
| 12 | —$C_4H_9$ | —$CH_2$—C$_6$H$_5$ | m.p. 246-248° C. |
| 13 | —$C_4H_9$ | —$COCH_3$ | m.p. 241-242° C. |
| 14 | —$C_2H_5$ | —$CH_2$—CH(OH)—$CH_3$ | m.p. 226-227° C. |
| 15 | —$C_4H_9$ | —$CH_2$—$CH_2$—OH | m.p. 144-145° C. |

TABLE 1-continued

[Chemical structure showing a complex molecule with R¹-N, R²-N groups, and multiple 2,2,6,6-tetramethylpiperidine rings connected through N centers]

| Example no. | R¹ | R² | Physical Properties |
|---|---|---|---|
| 16 | —C₄H₉ | —CH₂—CH(OH)—CH₂—O—C₆H₅ | m.p. 60–62° C. |
| 17 | —C₄H₉ | —CH₂CN | m.p. 185–186° C. |
| 18 | —CH₂CH₂—(2,2,6,6-tetramethylpiperidin-4-yl, NH) | H | m.p. 127–128° C. |

TABLE II

[Chemical structure showing X group attached to central N, with two 2,2,6,6-tetramethylpiperidine rings bearing R¹ and R² substituents]

| Example no. | X | R¹ | R² | Physical properties |
|---|---|---|---|---|
| 19 | —N(CH₃)₂ | —CH₃ | —H | m.p. 139–140° C. |
| 20 | —N(CH₃)₂ | —CH₃ | —CH₃ | m.p. 186° C. |
| 21 | —N(CH₃)₂ | —C₂H₅ | —H | m.p. 121° C. |
| 22 | —N(CH₃)₂ | —CH(CH₃)₂ | —H | m.p. 160–161° C. |
| 23 | —N(CH₃)₂ | —C₄H₉ | —H | m.p. 108–110° C. |
| 24 | —N(CH₃)₂ | —C₈H₁₇ | —H | m.p. 95–96° C. |
| 25 | —N(C₂H₅)₂ | —CH₃ | —H | m.p. 107–108° C. |
| 26 | —N(C₂H₅)₂ | —C₂H₅ | —H | m.p. 191–192° C. |
| 27 | —N(C₂H₅)₂ | —CH(CH₃)₂ | —H | m.p. 248° C. |
| 28 | —N(C₂H₅)₂ | —C₄H₉ | —H | m.p. 45° C. |
| 29 | —N(C₂H₅)₂ | —C₈H₁₇ | —H | m.p. 83–84° C. |
| 30 | —N(C₃H₇)₂ | —CH₃ | —H | m.p. 121–122° C. |
| 31 | —N(C₃H₇)₂ | —C₂H₅ | —H | m.p. 145–146° C. |
| 32 | —N(C₃H₇)₂ | —CH(CH₃)₂ | —H | m.p. 224° |
| 33 | —N[CH(CH₃)₂]₂ | —CH₃ | —H | m.p. 181–182° |
| 34 | —N[CH(CH₃)₂]₂ | —C₄H₉ | —H | m.p. 156° C. |
| 35 | —N(C₄H₉)₂ | —CH₃ | —H | resin |
| 36 | —N(C₄H₉)₂ | —C₂H₅ | —H | resin |
| 37 | —N(C₄H₉)₂ | —CH(CH₃)₂ | —H | m.p. 130° |
| 38 | —N(C₄H₉)₂ | —C₄H₉ | —H | resin |
| 39 | —N(C₄H₉)₂ | —C₄H₉ | —CH₂—CN | m.p. 170–171° |
| 40 | —N(C₈H₁₇)₂ | —CH₃ | —H | oil |
| 41 | —N(C₈H₁₇)₂ | —C₂H₅ | —H | m.p. ~30° |
| 42 | —OCH(CH₃)₂ | —C₄H₉ | —H | m.p. 85° |
| 43 | —OCH(CH₃)₂ | —C₄H₉ | —CH₂—CN | m.p. 214–215° |
| 44 | —OC₄H₉ | —CH₃ | —H | resin |

TABLE II-continued $$\text{structure with: } R^2-N, H_3C, CH_3, N, R^1, X, \text{ etc.}$$

| Example no. | X | R¹ | R² | Physical properties |
|---|---|---|---|---|
| 45 | —OC₄H₉ | —C₄H₉ | —H | resin |
| 46 | —OC₈H₁₇ | —CH₃ | —H | resin |
| 47 | —OC₈H₁₇ | —C₄H₉ | —H | resin |

EXAMPLE 48

Light Stabilising Action in PP Tapes 1,000 parts of polypropylene powder (melt index 1.5 g/10 minutes (230° C., 2,160 g)) are mixed with 0.05 part of pentaerythritol tetrakis-[β-(3,5-di-tert.-butyl-4-hydroxyphenyl)]-propionate, 0.05 part of tris-(2,4-di-tert.-butylphenyl) phosphite and 0.05 part of a light stabiliser of the formula I (cf. table below) in a drum mixer and the mixture is then granulated in an extruder at a temperature of 180°–220° C.

The resulting granules are processed in a second extruder equipped with a slot die (temperature 220°–260° C.) to give a film, which is cut into tapes, which are then stretched at elevated temperature in a stretching ratio of 1:6 and are reeled up (gauge of the tapes: 700–900 denier; ultimate tensile strength: 5.5–6.5 g/denier).

The polypropylene tapes thus prepared are mounted in a stress-free condition on a sample carrier and are exposed to light in a Xenotest 1200 apparatus. Groups of 5 test specimens are taken out after varying times and their ultimate tensile strength is determined. The exposure time after which the ultimate tensile strength of the tapes has declined to 50% of its initial value is taken as a measure of the stabilising action of the individual light stabilisers. The values obtained are listed in Table III.

TABLE III

Light stabilising action in PP tapes.

| Light stabiliser | Hours of exposure until ultimate tensile strength reaches 50% |
|---|---|
| None | 500 |
| 0.05% of the compound from Example No. 1 | 1,520 |
| 0.05% of the compound from Example No. 19 | 2,000 |
| 0.05% of the compound from Example No. 21 | 1,680 |
| 0.05% of the compound from Example No. 23 | 1,960 |
| 0.05% of the compound from Example No. 25 | 1,720 |
| 0.05% of the compound from Example No. 26 | 1,600 |
| 0.05% of the compound from Example No. 31 | 1,720 |

EXAMPLE 49

Light Stabilising Action in Polypropylene Films 100 parts of polypropylene powder (MFI 230°/2.16 kg ~ 12) are homogenised with 0.05 part of pentaerythritol tetrakis-3-(3,5-di-tert.-butyl-4-hydroxyphenyl)-propionate, 0.05 part of tris-(2,4-di-tert.-butylphenyl) phosphite and 0.15 part of a light stabiliser of the formula I (cf. table below) for 10 minutes at 200° C. in a Brabender plastograph. The composition thus obtained is taken out of the kneader as quickly as possible and compressed in a toggle press to give a plate 2–3 mm thick. A part of the crude molding obtained is cut out and compressed between two high-gloss foils of hard aluminium in a laboratory press for 6 minutes at 260° C. and 12 tonnes pressure to give a film 0.1 mm thick, which is immediately chilled in cold water. Sections measuring 45×45 mm are now punched out of this film and are exposed to light in a Xenotest 1200. These test specimens are taken out of the exposure apparatus at regular intervals of time and are tested for their carbonyl content in an IR spectrophotometer. The increase in carbonyl extinction in the course of the exposure is a measure of the photooxidative degradation of the polymer (cf. L. Blaban et al., J. Polymer Sci. Part C, 22, 1059–1071 (1969); J. F. Heacock, J. Polymer Sci. Part A-1, 22, 2921–34 (1969); D. J. Carlsson and D. M. Wiles, Macromolecules 2, 587–606 (1969)) and is known from experience to be associated with a decline in the mechanical properties of the polymer.

The time required to reach a carbonyl extinction of 0.100 is taken as a measure of the stabilising action.

The results are shown in Table IV.

TABLE IV

Light stabilising action in 0.1 mm PP films

| Light stabiliser | Hours in Xenotest 1200 until carbonyl extinction is 0.1 (T₀.₁) |
|---|---|
| None | 280 |
| 0.15% of the compound from Example No. 4 | 3,200 |

EXAMPLE 50

Solubility and Compatibility in High-Pressure Polyethylene Sheeting 100 parts of low density (0.917) polyethylene granules are homogenised for 10 minutes at 180° C. in a Brabander plastograph with 1 part of a stabiliser in the following table. The composition thus obtained is taken out of the kneader as quickly as possible and compressed in a toggle press to give a sheet 2–3 mm thick. A part of the crude moulding obtained is cut out and compressed between two high-gloss foils of hard aluminium in a manually operated hydraulic laboratory press for 6 minutes at 170° C. and 12 tonnes pressure to give a sheet 0.5 mm thick, which is immediately chilled in cold water. Sections measuring 60×44 mm are now punched out of this 0.5 mm sheet and are hung in a circulating-air oven at 60° C. At regular intervals of time these test specimens are taken out of the oven and checked visually for signs of efflorescence. The time required for marked efflorescence to be observed is taken as a measure of the compatibility.

The results are listed in Tables V and VI.

TABLE V

[Structure of compound]

| $R_2$ | $R_1$ | Compound from Example No. | Days before marked efflorescence occurs at 60° C. |
|---|---|---|---|
| H | $CH_3$ | 2 | dissolved 14 |
| H | $C_4H_9$ | 4 | dissolved >217 |
| H | $C_8H_{17}$ | 5 | dissolved >200 |
| H | $C_{12}H_{25}$ | 6 | dissolved >200 |

TABLE VI

[Structure of compound]

| X | $R_1$ | $R_2$ | Example No. | Days until marked efflorescence occurs at 60° C. |
|---|---|---|---|---|
| —N(CH$_3$)$_2$ | $CH_3$ | H | 19 | dissolved 79 |
| —N(CH$_3$)$_2$ | $CH_3$ | $CH_3$ | 20 | dissolved >79 |
| —N(C$_2$H$_5$)$_2$ | $CH_3$ | H | 25 | dissolved 79 |

TABLE VI-continued

[Structure of compound]

| X | $R_1$ | $R_2$ | Example No. | Days until marked efflorescence occurs at 60° C. |
|---|---|---|---|---|
| —OCH(CH$_3$)$_2$ | $C_4H_9$ | H | 45 | dissolved >79 |

What is claimed is:

1. A polyolefin containing as a stabilizer, a compound of the formula Ia

[Structure (Ia)]

in which $R_1$ is n-butyl, $R_2$ is $C_1$–$C_4$ alkyl, allyl, acetyl, acryloyl or a group —CH$_2$CH$_2$—OH or —CH$_2$—CH(R$_7$)OH and $R_7$ is methyl or ethyl.

2. A polyolefin according to claim 1, wherein the compound of the formula Ia is 2,4,6-tris-[N-(1',2',2',6',6'-pentamethylpiperidin-4-yl)-butylamino]-1,3,5-trizine.

3. A polyolefin according to claim 1, wherein the compound of the formula Ia is 2,4,6-tris-[N-(1'-allyl-2',2',6', 6'-tetramethylpiperidin-4-yl)-butylamino]-1,3,5-triazine.

4. A polyolefin according to claim 1, wherein the compound of the formula Ia is 2,4,6-tris-[N-(1'-acetyl-2',2',6', 6'-tetramethylpiperidin-4'-yl)-butylamino]-1,3,5-triazine.

5. A polyolefin according to claim 1, wherein the compound of the formula Ia is 2,4,6-tris-[N-(1'-(2''-hydroxyethyl)-2',2',6',6'-tetramethylpiperidin-4'-yl)-butylamino]-1,3,5-triazine.

6. A polyolefin according to claim 1, wherein the compound of the formula Ia is present in an amount of 0.01 to 5% by weight, based on the untreated polyolefin.

7. A polyolefin according to claim 1, wherein the polyolefin is high-density or low-density polyethylene, or polypropylene.

* * * * *